United States Patent
Steinberger et al.

(10) Patent No.: US 8,708,118 B2
(45) Date of Patent: Apr. 29, 2014

(54) TORQUE CONVERTER CLUTCH AND DAMPER

(75) Inventors: Markus Steinberger, Macedonia, OH (US); Patrick Lindemann, Wooster, OH (US); Craig Kneidel, Massillon, OH (US)

(73) Assignee: Schaeffler Technologies AG & Co. KG, Herzogenaurach (DE)

( * ) Notice: Subject to any disclaimer, the term of this patent is extended or adjusted under 35 U.S.C. 154(b) by 55 days.

(21) Appl. No.: 13/427,949

(22) Filed: Mar. 23, 2012

(65) Prior Publication Data

US 2012/0241271 A1 Sep. 27, 2012

Related U.S. Application Data

(60) Provisional application No. 61/467,808, filed on Mar. 25, 2011.

(51) Int. Cl.
*F16H 45/02* (2006.01)

(52) U.S. Cl.
USPC ...... 192/3.3; 192/3.29; 192/85.39; 192/55.61

(58) Field of Classification Search
USPC .............. 192/3.3, 3.29, 55.61, 85.39, 212
See application file for complete search history.

(56) References Cited

U.S. PATENT DOCUMENTS

| | | | | |
|---|---|---|---|---|
| 5,129,493 A * | 7/1992 | Edmunds | | 192/3.29 |
| 5,762,172 A * | 6/1998 | Tsukamoto et al. | | 192/3.29 |
| 6,053,292 A * | 4/2000 | Macdonald | | 192/3.28 |
| 6,099,435 A | 8/2000 | Halene et al. | | |
| 6,142,272 A | 11/2000 | Meisner et al. | | |
| 6,223,872 B1 * | 5/2001 | Heller et al. | | 192/3.29 |
| 6,244,401 B1 | 6/2001 | Maienschein et al. | | |
| 7,287,630 B2 * | 10/2007 | Takahashi | | 192/3.29 |
| 8,276,723 B2 * | 10/2012 | Verhoog et al. | | 192/3.29 |
| 2005/0039999 A1 * | 2/2005 | Back et al. | | 192/3.29 |
| 2008/0121485 A1 * | 5/2008 | Degler et al. | | 192/3.29 |
| 2008/0142325 A1 * | 6/2008 | Degler et al. | | 192/3.29 |
| 2009/0014269 A1 * | 1/2009 | Ari et al. | | 192/3.33 |
| 2009/0084649 A1 * | 4/2009 | Kombowski et al. | | 192/3.29 |
| 2009/0229938 A1 * | 9/2009 | Kombowski et al. | | 192/3.29 |
| 2011/0005880 A1 * | 1/2011 | Carrier et al. | | 192/3.29 |
| 2011/0120829 A1 * | 5/2011 | Vanni et al. | | 192/3.29 |
| 2011/0240432 A1 * | 10/2011 | Takikawa et al. | | 192/3.29 |

* cited by examiner

*Primary Examiner* — Rodney Bonck
*Assistant Examiner* — Lillian Nguyen
(74) *Attorney, Agent, or Firm* — Kevin L. Parks; Kathryn A. Warner

(57) ABSTRACT

A clutch and damper assembly for a torque converter includes a clutch piston with a piston friction surface for engaging the clutch and an outer sealing diameter, and a damper. The piston friction surface is disposed radially inward of the damper and the outer sealing diameter is disposed radially outward of the damper. In an example embodiment, the clutch piston includes an inner sealing diameter disposed radially inward of the piston friction surface. In some example embodiments, the damper includes a resilient element and a drive plate. The drive plate is drivingly engaged with the resilient element and frictionally engageable with the clutch piston.

18 Claims, 4 Drawing Sheets

TORQUE CONVERTER CLUTCH AND DAMPER

FIELD

The invention relates generally to a torque converter clutch and damper, and more specifically to a clutch having a friction surface disposed radially inward of a damper.

BACKGROUND

Clutches and dampers for torque converters are known. In one configuration, a clutch friction surface is disposed radially inward of the damper. Examples are shown in commonly assigned U.S. Pat. Nos. 6,099,435, 6,142,272, and 6,244,401, hereby incorporated by reference. Generally, for a clutch disposed radially inward of a damper, an outer piston sealing diameter is disposed radially inward of the damper, limiting available clutch capacity.

BRIEF SUMMARY

Example aspects broadly comprise a clutch and damper assembly for a torque converter including a clutch piston with a piston friction surface for engaging the clutch and an outer sealing diameter, and a damper. The piston friction surface is disposed radially inward of the damper and the outer sealing diameter is disposed radially outward of the damper. In an example embodiment, the clutch piston includes an inner sealing diameter disposed radially inward of the piston friction surface. In some example embodiments, the damper includes a resilient element and a drive plate. The drive plate is drivingly engaged with the resilient element and frictionally engageable with the clutch piston.

In some example embodiments, the damper includes a side plate and the drive plate is radially positioned by the side plate. In some example embodiments, the side plate includes a protrusion, the drive plate includes a notch for receiving the protrusion, and the drive plate is radially positioned by the protrusion installed in the notch. In some example embodiments, the resilient element is disposed in the notch. In an example embodiment, the resilient element is an arcuately-formed coil spring and the protrusion is disposed proximate a circumferential midpoint of the coil spring.

In some example embodiments, the clutch and damper assembly includes a cover for the torque converter with a circumferential sealing surface. The clutch piston includes a seal at the outer sealing diameter and engaged with the cover sealing surface. In an example embodiment, the piston is drivingly engaged with the cover. In some example embodiments, the clutch and damper assembly includes a drive ring having a circumferential sealing surface and fixedly attached to the cover. The clutch piston includes an inner sealing diameter disposed radially inward of the piston friction surface and a seal at the inner sealing diameter and engaged with the drive ring sealing surface. In an example embodiment, the damper includes a drive plate, the drive ring includes a ring friction surface, and the drive plate is frictionally engageable with the piston friction surface and the ring friction surface.

Other example aspects broadly comprise a torque converter including a clutch piston having a piston friction surface for engaging the clutch and an outer sealing diameter, a damper, a cover, a drive ring fixedly attached to the cover, a turbine, and a side plate fixedly attached to the turbine. The piston friction surface is disposed radially inward of the damper, the outer sealing diameter is disposed radially outward of the damper, and the drive ring and the side plate are arranged for thrust engagement during operation of the torque converter when the turbine is urged towards the cover. In an example embodiment, the damper includes a drive plate radially positioned by the side plate.

BRIEF DESCRIPTION OF THE DRAWINGS

The nature and mode of operation of the present invention will now be more fully described in the following detailed description taken with the accompanying drawing figures, in which.

DETAILED DESCRIPTION

At the outset, it should be appreciated that like drawing numbers appearing in different drawing views identify identical, or functionally similar, structural elements. Furthermore, it is understood that this invention is not limited only to the particular embodiments, methodology, materials and modifications described herein, and as such may, of course, vary. It is also understood that the terminology used herein is for the purpose of describing particular aspects only, and is not intended to limit the scope of the present invention, which is limited only by the appended claims.

Unless defined otherwise, all technical and scientific terms used herein have the same meaning as commonly understood to one of ordinary skill in the art to which this invention belongs. Although any methods, devices or materials similar or equivalent to those described herein can be used in the practice or testing of the invention, the following example methods, devices, and materials are now described.

Figure 1A:
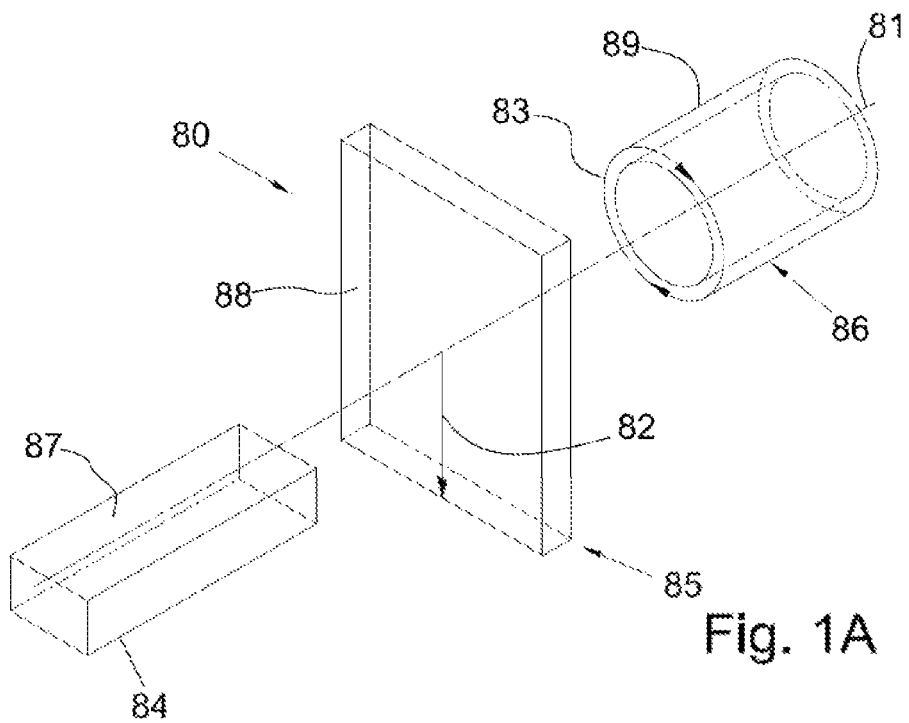
FIG. 1A is a perspective view of a cylindrical coordinate system demonstrating spatial terminology used in the present application.

FIG. 1A is a perspective view of cylindrical coordinate system 80 demonstrating spatial terminology used in the present application. The present invention is at least partially described within the context of a cylindrical coordinate system. System 80 has a longitudinal axis 81, used as the reference for the directional and spatial terms that follow. The adjectives "axial," "radial," and "circumferential" are with respect to an orientation parallel to axis 81, radius 82 (which is orthogonal to axis 81), and circumference 83, respectively. The adjectives "axial," "radial" and "circumferential" also are regarding orientation parallel to respective planes. To clarify the disposition of the various planes, objects 84, 85, and 86 are used. Surface 87 of object 84 forms an axial plane. That is, axis 81 forms a line along the surface. Surface 88 of object 85 forms a radial plane. That is, radius 82 forms a line along the surface. Surface 89 of object 86 forms a circumferential plane. That is, circumference 83 forms a line along the surface. As a further example, axial movement or disposition is parallel to axis 81, radial movement or disposition is parallel to radius 82, and circumferential movement or disposition is parallel to circumference 83. Rotation is with respect to axis 81.

The adverbs "axially," "radially," and "circumferentially" are with respect to an orientation parallel to axis 81, radius 82, or circumference 83, respectively. The adverbs "axially," "radially," and "circumferentially" also are regarding orientation parallel to respective planes.

Figure 1B:
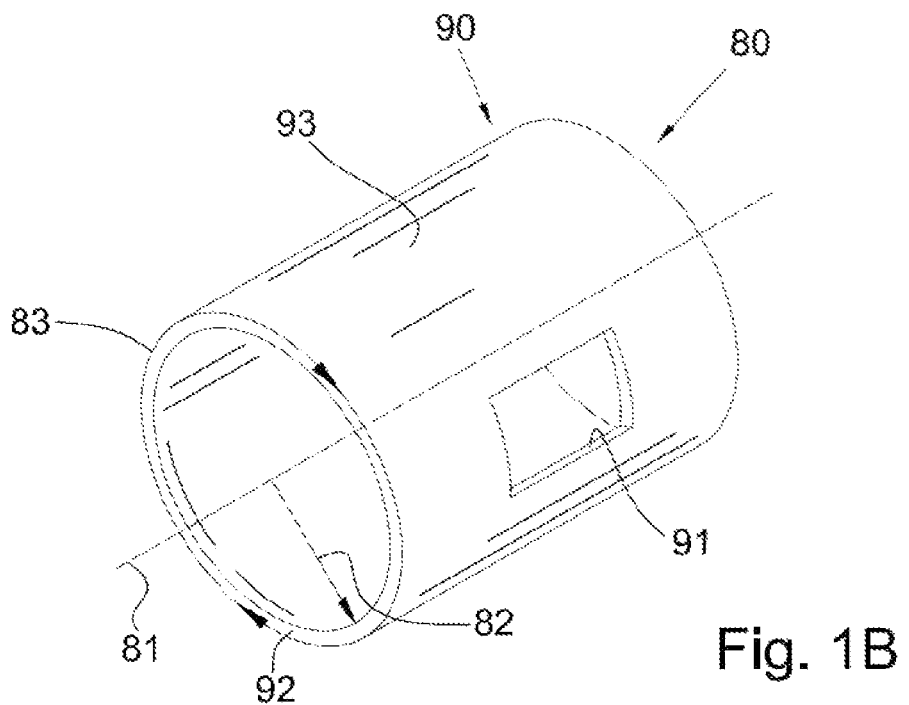
FIG. 1B is a perspective view of an object in the cylindrical coordinate system of FIG. 1A demonstrating spatial terminology used in the present application.

FIG. 1B is a perspective view of object 90 in cylindrical coordinate system 80 of FIG. 1A demonstrating spatial terminology used in the present application. Cylindrical object 90 is representative of a cylindrical object in a cylindrical coordinate system and is not intended to limit the present invention in any manner. Object 90 includes axial surface 91, radial surface 92, and circumferential surface 93. Surface 91 is part of an axial plane, surface 92 is part of a radial plane, and surface 93 is part of a circumferential plane.

Figure 2:
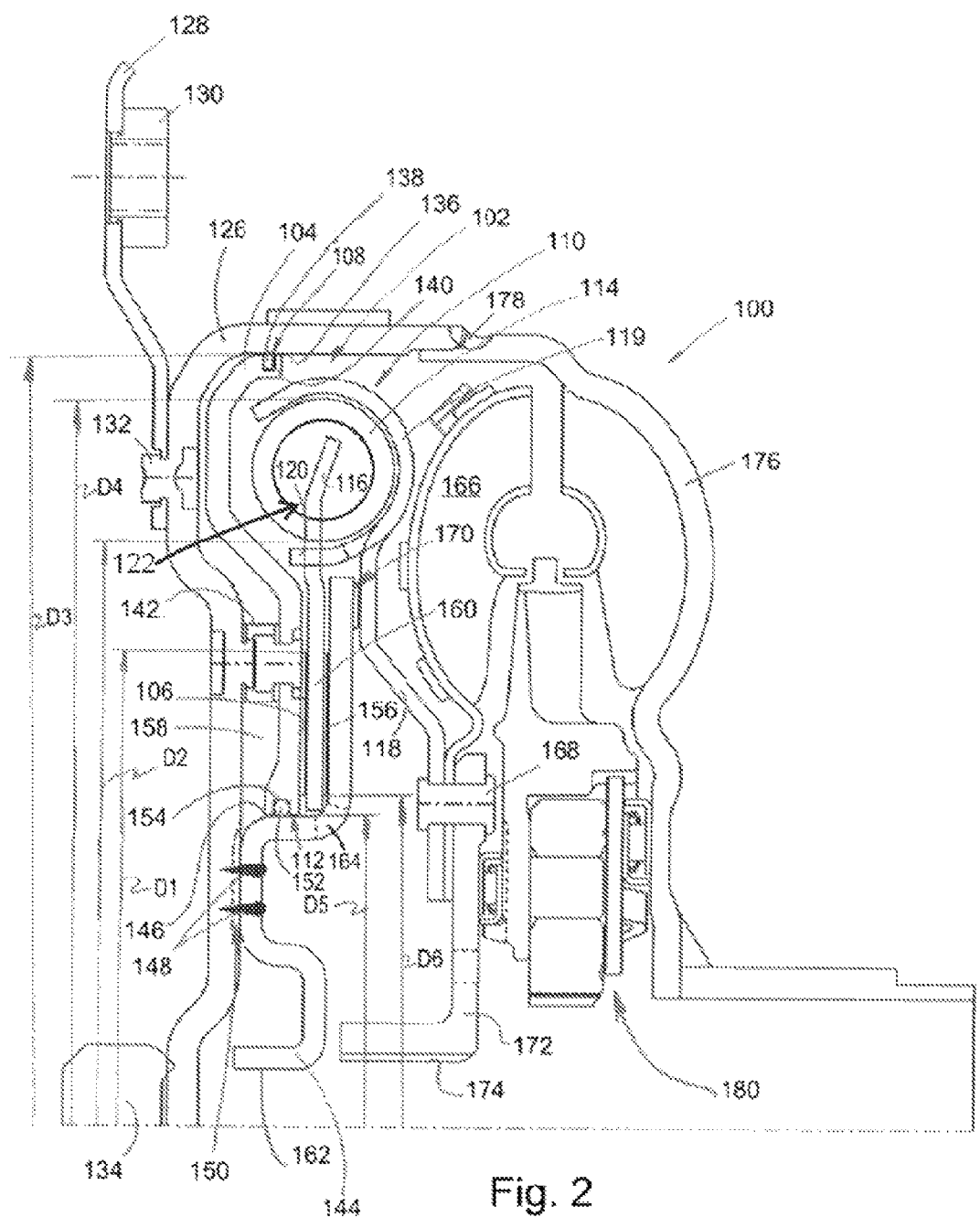
FIG. 2 is a top-half section view of a torque converter including clutch and damper assembly.
Figures 3, 4:
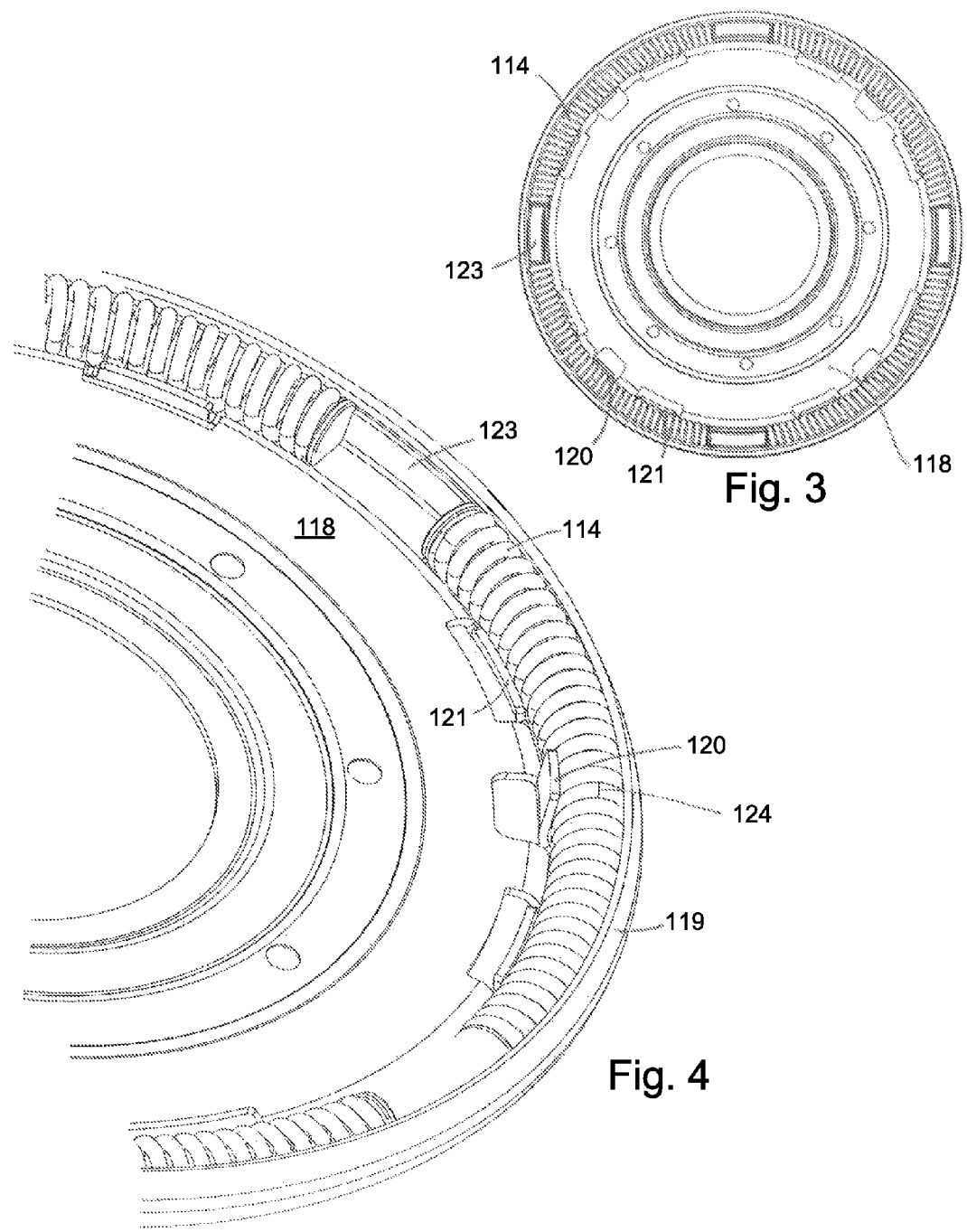
FIG. 3 is a front view of the damper of FIG. 2.
FIG. 4 is a perspective view of a portion of the damper of FIG. 2

The following description is made with reference to FIGS. 2-4. FIG. 2 is a top-half section view of torque converter 100 including clutch and damper assembly 102. FIG. 3 is a front view of damper 110 of torque converter 100. FIG. 4 is a perspective view of a portion of damper 110.

Assembly 102 includes clutch piston 104 with friction surface 106 and outer sealing diameter 108, and damper 110. Piston 104 can be made of steel or aluminum, for example, or any other material known in the art. In an example embodiment, piston 104 is made of cast aluminum and processed by machining Piston friction surface 106 is disposed radially inward of damper 110. That is, outer diameter D1 of friction surface 106 is less than inner diameter D2 of damper 110. Outer sealing diameter 108 is disposed radially outward of damper 110. That is, sealing diameter D3 is greater than damper outer diameter D4. Clutch piston 104 includes inner sealing diameter 112 disposed radially inward of piston friction surface 106. That is, sealing diameter D5 is less than inner diameter D6 of friction surface 106.

Damper 110 includes resilient element 114 and drive plate 116. Drive plate 116 is drivingly engaged with resilient element 114 and frictionally engageable with clutch piston 104. In an example embodiment, element 114 is a coil spring. Although spring 114 is shown as a single spring, spring 114 may be a plurality of concentric springs as is known in the art. Damper 110 includes side plate 118 with portion 119 for receiving spring 114. That is, spring 114 is at least partially axially and/or radially positioned by side plate 118 at portion 119.

Drive plate 116 is radially positioned by side plate 118. That is, side plate 118 includes protrusion 120, drive plate 116 includes notch 122 for receiving protrusion 120 and drive plate 116 is radially positioned by protrusion 120 installed in notch 122. In an example embodiment, resilient element 114 is disposed in notch 122. In an example embodiment, resilient element 114 is an arcuately-formed coil spring and protrusion 120 is disposed proximate circumferential midpoint 124 of coil spring 114 to aid circumferential installation of spring 114 into portion 119. In an example embodiment, side plate 118 includes protrusions 121 arranged for retaining spring 114 in portion 119. In an example embodiment, side plate 118 includes end stops 123 for restricting circumferential motion of springs 114 relative to plate 118.

Assembly 102 further includes cover 126 for torque converter 100. Drive plate 128 is fixedly attached to cover 126. Plate 128 includes with fasteners 130 for driving engagement with a prime mover (not shown). In an example embodiment, plate 128 is fixed to cover 126 by extruded rivets 132. Pilot 134 is fixedly attached to cover 126 by projection welding, for example, for positioning with a crankshaft (not shown) of the prime mover. Cover 126 includes circumferential sealing surface 136 and clutch piston 104 includes seal 138 at outer sealing diameter 108. Seal 138 is engaged with cover sealing surface 136. That is, seal 138 is disposed in groove 140 at outer sealing diameter 108 and compressively engaged with surface 128 to create a liquid-tight seal. Seal 138 may be an o-ring, d-ring or square cut dynamic seal, for example. In an example embodiment, piston 104 is drivingly engaged with cover at leaf springs 142, limiting relative circumferential motion between piston 104 and cover 126, and seal 138 is a d-ring seal.

Assembly 102 includes drive ring 144 with circumferential sealing surface 146. Ring 144 is fixedly attached to cover 126 at welds 148, for example. In an example embodiment, welds 148 are laser welds. Cover 126 includes radial flow channel 150 disposed adjacent ring 144 allowing fluid communication between cover 126 and ring 144. Clutch piston 104 includes seal 152 at inner sealing diameter 112. Seal 152 is engaged with drive ring sealing surface 146. That is, seal 152 is disposed in groove 154 at inner sealing diameter 112 and compressively engaged with surface 146 to create a liquid-tight seal. Seal 152 may be an o-ring, d-ring, or square cut dynamic seal, for example. In an example embodiment, seal 152 is an o-ring seal.

Drive ring 144 includes ring friction surface 156. Drive plate 116 is frictionally engageable with piston friction surface 106 and ring friction surface 156. That is, piston 104 axially displaces towards ring 144 when apply pressure is introduced into chamber 158 between piston 104 and cover 126 through channel 150. Displacement of piston 104 clamps annular portion 160 of drive plate 116 against ring 144, frictionally engaging the clutch. Friction surfaces 106 and 156, or mating surfaces of portion 160 may include friction material. Drive ring 144 includes inner sealing surface 162 for sealing engagement with an input shaft for a transmission (not shown). In an example embodiment, the friction material includes grooves for cooling the clutch and flow hole 164 allows passage of oil for cooling friction surfaces 106 and 156 away from the clutch.

Torque converter 100 includes turbine 166. Side plate 118 is fixedly attached to turbine 166 by rivet 168, for example. Drive ring 144 and side plate 118 are arranged for thrust engagement during operation of torque converter 100. That is, during particular operating modes of torque converter 100, hydrodynamic forces urge turbine 166 towards cover 126. Friction interface 170 reacts turbine thrust to cover 126 through side plate 118 and drive ring 144. Friction interface 170 may include friction material fixedly attached by adhesive, for example, to plate 118 or ring 144. In an example embodiment, friction material is attached to ring 144.

Hub 172 is fixedly attached to turbine 166 by rivet 168 and includes spline portion 174 for driving engagement with the transmission input shaft. Torque converter 100 also includes impeller 176 fixedly attached to cover 126 at weld 178. Converter 100 may include stator assembly 180 axially disposed between impeller 176 and turbine 166.

Figure 5:
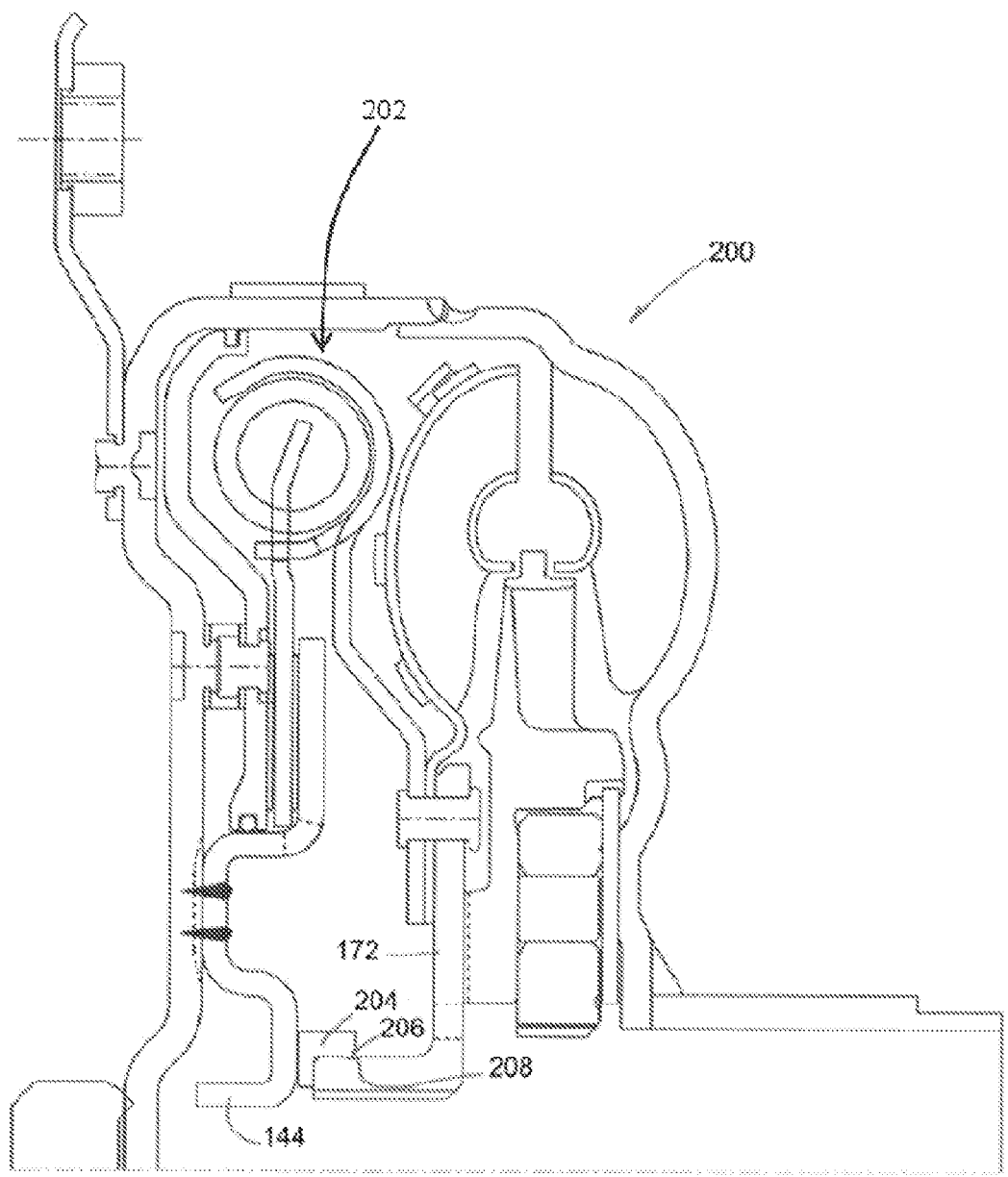
FIG. 5 is a top-half section view of a torque converter including a clutch and damper assembly and an axial thrust bushing.

The following description is made with reference to FIG. 5. FIG. 5 is a top-half section view of torque converter 200 including clutch and damper assembly 202 and axial thrust bushing 204. Description of converter 100 is generally applicable to converter 200 except as noted below. Thrust bushing 204 is arranged for thrust engagement with drive ring 144 and hub 172 during operation of torque converter 200. Bushing 204 is retained to hub 172 by engagement of radial nub 206 of bushing 204 with radial dimple 208 in hub 172. In an example embodiment, bushing 204 is a roller bearing.

Of course, changes and modifications to the above examples of the invention should be readily apparent to those having ordinary skill in the art, without departing from the spirit or scope of the invention as claimed. Although the invention is described by reference to specific preferred and/or example embodiments, it is clear that variations can be made without departing from the scope or spirit of the invention as claimed.

What we claim is:

1. A clutch and damper assembly for a torque converter comprising:
    a clutch piston including:
        a piston friction surface for engaging the clutch; and,
        an outer sealing diameter; and,
        a damper, wherein the piston friction surface is disposed radially inward of the damper and the outer sealing diameter is disposed radially outward of the damper; and
    a cover for the torque converter including a circumferential sealing surface, wherein the clutch piston includes a seal at the outer sealing diameter and engaged with the cover sealing surface.

2. The clutch and damper assembly of claim 1, wherein the clutch piston includes an inner sealing diameter disposed radially inward of the piston friction surface.

3. The clutch and damper assembly of claim 1, wherein the damper includes:
    a resilient element; and,
    a drive plate, wherein the drive plate is drivingly engaged with the resilient element and frictionally engageable with the clutch piston.

4. The clutch and damper assembly of claim 3, wherein the damper includes a side plate and the drive plate is radially positioned by the side plate.

5. The clutch and damper assembly of claim 4, wherein:
    the side plate includes a protrusion;
    the drive plate includes a notch for receiving the protrusion; and,
    the drive plate is radially positioned by the protrusion installed in the notch.

6. The clutch and damper assembly of claim 5, wherein the resilient element is disposed in the notch.

7. The clutch and damper assembly of claim 6, wherein the resilient element is an arcuately-formed coil spring and the protrusion is disposed proximate a circumferential midpoint of the coil spring.

8. The clutch and damper assembly of claim 1, wherein the piston is drivingly engaged with the cover.

9. The clutch and damper assembly of claim 1, further comprising a drive ring having a circumferential sealing surface and fixedly attached to the cover, wherein the clutch piston includes:
    an inner sealing diameter disposed radially inward of the piston friction surface; and,
    a seal at the inner sealing diameter and engaged with the drive ring sealing surface.

10. The clutch and damper assembly of claim 9, wherein:
    the damper includes a drive plate;
    the drive ring includes a ring friction surface; and,
    the drive plate is frictionally engageable with the piston friction surface and the ring friction surface.

11. A torque converter comprising:
    the clutch and damper assembly of claim 1;
    a turbine; and,
    a side plate fixedly attached to the turbine.

12. The torque converter of claim 11, further comprising a drive ring fixedly attached to the cover.

13. The torque converter of claim 12, wherein the drive ring includes a circumferential sealing surface.

14. The torque converter of claim 12, wherein the drive ring further includes a ring friction surface; and the drive plate frictionally engageable with the piston friction surface and the ring friction surface.

15. The torque converter of claim 12, wherein the drive ring and the side plate are arranged for thrust engagement during operation of the torque converter when the turbine is urged towards the cover.

16. The torque converter of claim 12, wherein the clutch piston further includes an inner sealing diameter disposed radially inward of the piston friction surface; and, a seal at the inner sealing diameter and engaged with the drive ring sealing surface.

17. A torque converter comprising:
    a clutch piston including:
        a piston friction surface for engaging the clutch piston; and,
        an outer sealing diameter;
    a damper;
    a cover including a circumferential sealing surface wherein the clutch piston includes a seal at the outer sealing diameter and engaged with the cover sealing surface;
    a drive ring fixedly attached to the cover;
    a turbine; and,
    a side plate fixedly attached to the turbine, wherein:
        the piston friction surface is disposed radially inward of the damper;
        the outer sealing diameter is disposed radially outward of the damper; and,
        the drive ring and the side plate are arranged for thrust engagement during operation of the torque converter when the turbine is urged towards the cover.

18. The torque converter of claim 17, wherein the damper comprises a drive plate radially positioned by the side plate.

* * * * *